(12) United States Patent
Hotoda (10) Patent No.: US 8,056,917 B2
(45) Date of Patent: Nov. 15, 2011

(54) BICYCLE

(76) Inventor: Hideo Hotoda, Edogawa-ku (JP)

( * ) Notice: Subject to any disclaimer, the term of this patent is extended or adjusted under 35 U.S.C. 154(b) by 249 days.

(21) Appl. No.: 12/093,795

(22) PCT Filed: Mar. 13, 2006

(86) PCT No.: PCT/JP2006/304883
§ 371 (c)(1),
(2), (4) Date: May 21, 2009

(87) PCT Pub. No.: WO2007/057992
PCT Pub. Date: May 24, 2007

(65) Prior Publication Data
US 2010/0013185 A1  Jan. 21, 2010

(30) Foreign Application Priority Data
Nov. 17, 2005  (JP) ................... 2005-333083

(51) Int. Cl.
*B62M 1/02* (2006.01)
(52) U.S. Cl. ........................ 280/259; 280/283
(58) Field of Classification Search ............... 280/259, 280/260, 261, 262, 283, 284, 285, 286
See application file for complete search history.

(56) References Cited

U.S. PATENT DOCUMENTS

| 613,244 | A | * | 11/1898 | Chrisman | 280/260 |
| 653,862 | A | * | 7/1900 | Clark | 280/260 |
| 5,228,710 | A | * | 7/1993 | Lu | 280/260 |
| 5,271,635 | A | * | 12/1993 | Lu | 280/275 |
| 5,403,027 | A | * | 4/1995 | Hwang | 280/261 |

FOREIGN PATENT DOCUMENTS

| JP | 55-500820 | 10/1980 |
| JP | 57-114773 | 7/1982 |
| JP | 08-282562 | 10/1996 |
| JP | 10-016855 | 1/1998 |

* cited by examiner

*Primary Examiner* — Kevin Hurley
(74) *Attorney, Agent, or Firm* — Berenato & White, LLC (57) ABSTRACT

A bicycle is provided on which a person can efficiently ride in a comfortable posture along a slope and effectively utilize the strength of the legs while pedaling along a level road. This bicycle includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame supporting a middle part of the stem in such a way that a front-end part thereof makes a handling turn freely, and extending rearward; a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and a rear wheel disposed via a rear wheel shaft a predetermined height above the joint members at the rear wheel-shaft supporting member in such a way that the rear wheel rotates freely, and rotated by a pedal-attached crank on each side.

3 Claims, 9 Drawing Sheets

PRIOR ART

BICYCLE

CROSS-REFERENCE TO RELATED APPLICATIONS AND CLAIM TO PRIORITY

This application is a National Phase of International Application No. PCT/JP2006/304883 filed Mar. 13, 2006 and relates to Japanese Patent Application No. 2005-333083 filed Nov. 17, 2005, of which the disclosures are incorporated herein by reference and to which priority is claimed.

BACKGROUND OF THE INVENTION

1. Field of the Invention

The present invention relates to a bicycle on which a person can efficiently ride in a comfortable posture along a slope and effectively utilize the strength of the legs while pedaling along a level road.

2. Description of the Background Art

Figure 9:
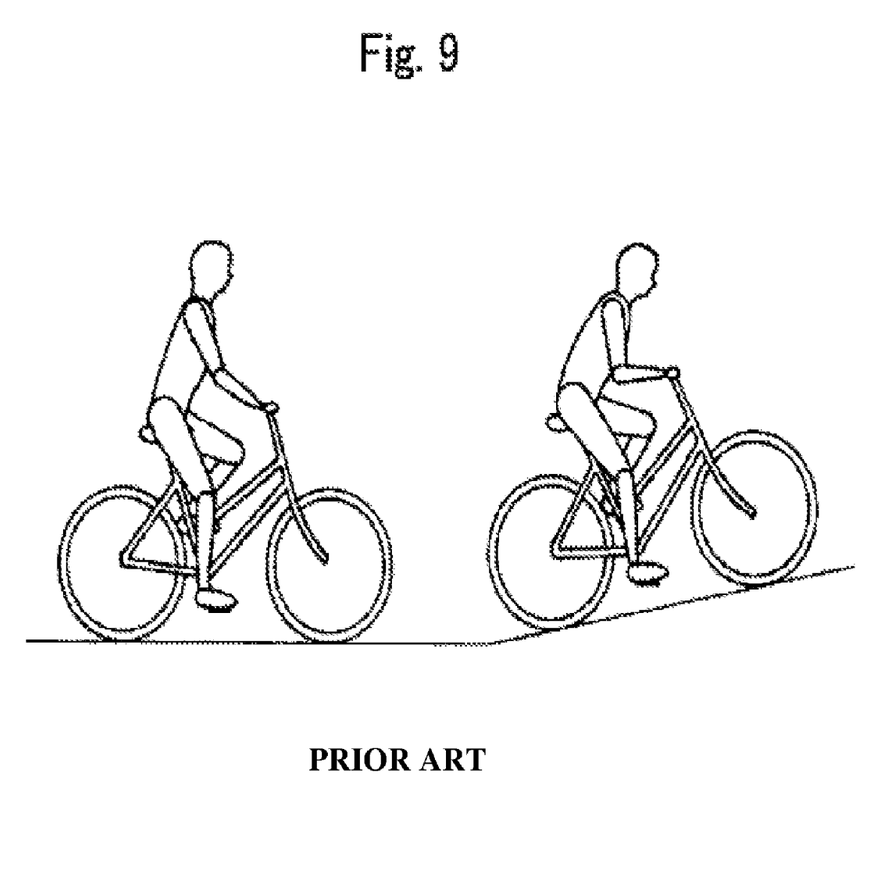
FIG. 9 is a side view showing running states of a conventional bicycle.

In general, when going up a slope on a bicycle, as shown in FIG. 9, a rider along with the bicycle inclines backward with its uphill gradient. This forces the rider to pedal while bending the upper body more forward than when riding along a level road. This posture hinders the rider from exerting the strength of the legs effectively. Or, the rider may come apart from the saddle, thus forcing the rider to use significantly more labor.

In order to reduce labor taken to ride along an uphill, therefore, a bicycle in which the position of a saddle can be adjusted has conventionally been developed. However, any such bicycle is difficult to operate and handle (refer to Registered Utility Model Publication No. 36881, Japanese Patent Laid-Open Publication No. 57-114773 and Japanese Patent Laid-Open Publication No. 8-282562).

In addition, a chainless bicycle has also been developed in which the shaft of the rear wheel can be directly rotated using crank-attached pedals. This helps lighten the bicycle and simplify its structure. In such a bicycle, however, its body may turn over backward around a rear wheel on an uphill slope.

The above described conventional bicycle in which the position of the saddle can be adjusted has the problem of making it harder for the rider to operate and handle it. On the other hand, the chainless bicycle in which the shaft of the rear wheel can be directly rotated using crank-attached pedals has the problem of turning its body back around the rear wheel on an uphill slope.

SUMMARY OF THE INVENTION

In view of the present situation described above, it is an object of the present invention to provide a bicycle on which a rider can change the relative position between the handle and the saddle easily when shifting from a level road to an uphill or a downhill, pedal comfortably along a slope while keeping the saddle substantially horizontal, and exert the strength of the legs stably and effectively even along an uphill using a chainless system.

In order to solve the above described problems, the present invention offers the following configurations.

A bicycle according to a first aspect of the present invention includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame supporting a middle part of the stem in such a way that a front-end part thereof makes a handling turn freely, and extending rearward; a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and a rear wheel disposed via a rear wheel shaft a predetermined height above the joint members at the rear wheel-shaft supporting member in such a way that the rear wheel rotates freely, and rotated by a pedal-attached crank on each side.

A bicycle according to a second aspect of the present invention includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame disposed at a middle part of the stem in such a way that a front-end part thereof makes a handling turn freely and makes an up-and-down motion freely, held by an elastic member disposed in the stem, and extending rearward from the front-end part; a rear frame fixing a saddle on an upper-end part thereof, including a rear wheel-shaft supporting member in a lower part thereof and fixing a lower-end part of the rear wheel-shaft supporting member on a rear-end part of the front frame; and a rear wheel disposed via a rear wheel shaft at the lower-end part of the rear wheel-shaft supporting member in such a way that the rear wheel rotates freely, and rotated by a pedal-attached crank on each side.

A bicycle according to a third aspect of the present invention includes: a stem fixing a handle on an upper-end part thereof and including a front wheel-shaft supporting member in a lower part thereof; a front wheel shaft held by an elastic member disposed at a lower-end part of the front wheel-shaft supporting member and disposed so as to make an up-and-down motion freely; a front wheel attached pivotally via the front wheel shaft; a front frame supporting a middle part of the stem in such a way that a front-end part thereof makes a handling turn freely, and extending rearward; a rear frame fixing a saddle on an upper-end part thereof, including a rear wheel-shaft supporting member in a lower part thereof and fixing a lower-end part of the rear wheel-shaft supporting member on a rear-end part of the front frame; and a rear wheel disposed via a rear wheel shaft at the lower-end part of the rear wheel-shaft supporting member in such a way that the rear wheel rotates freely, and rotated by a pedal-attached crank on each side.

A bicycle according to a fourth aspect of the present invention in which in the bicycle according to the second aspect, an upper frame is provided which connects the front-end part of the front frame and an upper-end part of the rear frame.

A bicycle according to a fifth aspect of the present invention in which in the bicycle according to the third aspect, an upper frame is provided which connects the front-end part of the front frame and an upper-end part of the rear frame.

A bicycle according to a sixth aspect of the present invention includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame disposed at a middle part of the stem in such a way that a front-end part thereof makes a handling turn freely and makes an up-and-down motion freely, held by an elastic member disposed in the stem, and extending rearward from the front-end part; a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and a rear wheel disposed via a rear wheel shaft a predetermined height above the joint members at the rear wheel-shaft supporting member in such a way that the rear wheel rotates freely, and rotated by a pedal-attached crank on each side.

A bicycle according to a seventh aspect of the present invention includes: a stem fixing a handle on an upper-end part thereof and including a front wheel-shaft supporting member in a lower part thereof; a front wheel shaft held by an elastic member at a lower-end part of the front wheel-shaft supporting member and disposed so as to make an up-and-down motion freely; a front wheel attached pivotally via the front wheel shaft; a front frame supporting a middle part of the stem in such a way that a front-end part thereof makes a handling turn freely, and extending rearward; a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and a rear wheel disposed via a rear wheel shaft a predetermined height above the joint members at the rear wheel-shaft supporting member in such a way that the rear wheel rotates freely, and rotated by a pedal-attached crank on each side.

A bicycle according to an eighth aspect of the present invention includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame supporting a middle part of the stem in such a way that a front-end part thereof makes a handling turn freely, and extending rearward; a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and a rear wheel disposed via a rear wheel shaft coaxial with the joint members in such a way that the rear wheel rotates freely, and rotated by a pedal-attached crank on each side.

A bicycle according to a ninth aspect of the present invention includes: a stem fixing a handle on an upper-end part thereof and including a front wheel-shaft supporting member in a lower part thereof; a front wheel attached pivotally via a front wheel shaft to a lower-end part of the front wheel-shaft supporting member; a front frame supporting a middle part of the stem in such a way that a front-end part thereof makes a handling turn freely, and extending rearward; a rear frame fixing a saddle on an upper-end part thereof, including a rear-frame supporting member in a lower part thereof, and attached pivotally at a lower-end part of the rear-frame supporting member via joint members to a rear-end part of the front frame in such a way that the rear frame sways back and forth freely; and a rear wheel disposed via a rear wheel shaft a predetermined distance apart downward from the joint members at the rear-end part of the front frame in such a way that the rear wheel rotates freely, and rotated by a pedal-attached crank on each side.

A bicycle according to a tenth aspect of the present invention in which in the bicycle according to any one of the first, sixth, seventh, eighth and ninth aspects, a stopper is provided which regulates the sway of the rear frame within a predetermined range.

A bicycle according to an eleventh aspect of the present invention in which in the bicycle according to any one of the second, forth and sixth aspects, a stopper is provided which regulates the up-and-down motion of the front-end part of the front frame within a predetermined range.

A bicycle according to a twelfth aspect of the present invention in which in the bicycle according to any one of the third, fifth and seventh aspects, a stopper is provided which regulates the up-and-down motion of the front wheel-shaft supporting member within a predetermined range.

A bicycle according to a thirteenth aspect of the present invention in which in the bicycle according to any one of the first, sixth, seventh, eighth, ninth and tenth aspects, a lock mechanism is provided which regulates the sway of the rear frame freely in an arbitrary position.

A bicycle according to a fourteenth aspect of the present invention in which in the bicycle according to any one of the second, forth, sixth and eleventh aspects, a lock mechanism is provided which regulates the up-and-down motion of the front-end part of the front frame freely in an arbitrary position.

A bicycle according to a fifteenth aspect of the present invention in which in the bicycle according to any one of the third, fifth, seventh and twelfth aspects, a lock mechanism is provided which regulates the up-and-down motion of the front wheel-shaft supporting member freely in an arbitrary position.

In the bicycle according to the first aspect of the present invention, the rear frame fixing the saddle on an upper-end part thereof and including the rear wheel-shaft supporting member in a lower part thereof is pivotally attached via the joint members to a rear-end part of the front frame in such a way that the rear frame can sway back and forth freely. The rear wheel shaft is disposed a predetermined height above the joint members. Therefore, if the bicycle begins to go up a slope when riding along a level road, a hill-climbing resistance working on the front wheel presses the front frame back and pushes the lower-end part of the rear wheel-shaft supporting member rearward. This turns the rear frame around the rear wheel shaft and moves the saddle forward. This prompts the rider sitting on the saddle to bend both arms more so as to shorten the distance between a grip portion in the handle and a seat portion on the saddle. This makes it possible to pedal almost in the same posture as riding along a level road and go uphill while exerting the strength of the legs effectively.

Furthermore, upon coming to a downhill while riding, the running resistance working on the front wheel becomes weaker. This moves the front frame forward and pulls forward the lower-end part of the rear wheel-shaft supporting member. This turns the rear frame around the rear wheel shaft and moves the saddle backward. This prompts the rider to stretch both arms so as to lengthen the distance between the grip portion in the handle and the seat portion on the saddle. This makes it possible to straighten the back substantially vertically almost in the same way as riding along a level road and go downhill in such a comfortable posture.

Moreover, the rider can move the saddle to a proper position relatively easily by simply moving the body. This makes it possible to go uphill or downhill while exerting the strength of the legs effectively in an optimum posture.

In addition, the rear frame is pivotally attached so as to sway freely, so that the position of the saddle can be easily changed. This makes it easier for the rider to shift the weight. Therefore, using a chainless system, the bicycle can be stably ridden without turning over even along an uphill.

Furthermore, the lower-end part of the rear wheel-shaft supporting member is pivotally attached via the joint members to the rear-end part of the front frame, and the rear wheel shaft is disposed a predetermined height above the joint members. Hence, if the rear wheel-shaft supporting member turns around the rear wheel shaft, the part of the rear wheel-shaft supporting member from the rear wheel shaft up to the joint members functions as a balancer for holding the rear frame substantially vertically. Specifically, the joint members receive a downward force by the weight of the part of the rear wheel-shaft supporting member from the rear wheel shaft up to the joint members and a load applied to the rear-end part of the front frame. At the same time, the rear-end part of the front frame restrains the rear frame from turning around the rear wheel shaft. This helps hold the rear frame substantially vertically around the rear wheel shaft as well as hold the saddle on a substantially vertical line along the rear frame. Hence, such a vehicle can be ridden more stably and more safely. Besides, since the rear frame is held substantially vertically, the rear wheel bears the weight of the rider substantially vertically. This heightens the pressure by which the rear wheel is in contact with the ground, and thus, raises the driving force. Consequently, the rear wheel rotated forward by the pedals can be prevented from skidding (slipping) when riding in rain or the like.

In the bicycle according to the second aspect, the front-end part of the front frame extending rearward is disposed at a middle part of the stem in such a way that it can make a handling turn freely and make an up-and-down motion freely. Then, it is held by the elastic member disposed in the stem. Therefore, if the bicycle begins to go up a slope when riding along a level road, a hill-climbing resistance working on the front wheel moves the front-end part of the front frame toward the lower end of the stem against the force of the elastic member and inclines the front frame. This inclines the rear frame as well and moves the saddle forward. This prompts the rider sitting on the saddle to bend both arms more so as to shorten the distance between a grip portion in the handle and a seat portion on the saddle. This makes it possible to pedal almost in the same posture as riding along a level road and go uphill while exerting the strength of the legs effectively.

In addition, the saddle moves forward, thus also shifting the weight of the rider forward. Therefore, using a chainless system, the bicycle can be stably ridden without turning over even along an uphill.

Furthermore, upon coming to a downhill while running, the running resistance working on the front wheel becomes weaker. Then, the force of the elastic member moves the front-end part of the front frame toward the upper end of the stem and inclines the front frame. This inclines the rear frame as well and moves the saddle backward. This prompts the rider to stretch both arms so as to lengthen the distance between the grip portion in the handle and the seat portion on the saddle. This makes it possible to straighten the back substantially vertically almost in the same way as riding along a level road and go downhill in such a comfortable posture.

In the bicycle according to the third aspect, the front wheel shaft is held by the elastic member disposed at a lower-end part of the front wheel-shaft supporting member and disposed so as to make an up-and-down motion freely. Therefore, if the bicycle begins to go up a slope when riding along a level road, a hill-climbing resistance working on the front wheel moves the front wheel shaft upward against the force of the elastic member, in other words, moves the stem downward with respect to the front wheel shaft. As the stem moves down, the rear frame fixed via the front frame by the stem also inclines forward. This brings the rear frame nearly vertically and moves the saddle forward. This makes it possible for the rider sitting on the saddle to pedal along the uphill while exerting the strength of the legs effectively.

In addition, the saddle moves forward, thus also shifting the weight of the rider forward. Therefore, using a chainless system, the bicycle can be stably ridden without turning over even along an uphill.

Furthermore, upon coming to a downhill while riding, the running resistance working on the front wheel becomes weaker. Then, the force of the elastic member moves the front wheel shaft down against the force of the elastic member, in other words, moves the stem up with respect to the front wheel shaft. As the stem moves down, the rear frame fixed via the front frame by the stem also inclines backward. This brings the rear frame nearly vertically. This makes it possible for the rider sitting on the saddle to straighten the back substantially vertically almost in the same way as riding along a level road and ride in such a comfortable posture.

In the bicycle according to the fourth aspect, the upper frame is provided which connects the front-end part of the front frame and the upper-end part of the rear frame. This presents an advantage, in addition to those according to the second aspect, in that the frames of the vehicle become more rigid.

In the bicycle according to the fifth aspect, the upper frame is provided which connects the front-end part of the front frame and the upper-end part of the rear frame. This presents an advantage, in addition to those according to the third aspect, in that the frames of the vehicle become more rigid.

In the bicycle according to the sixth aspect, the rear frame fixing the saddle on an upper-end part thereof and including the rear wheel-shaft supporting member in a lower part thereof is attached pivotally via the joint members to a rear-end part of the front frame in such a way that the rear frame can sway back and forth freely. Further, the front frame extending rearward is disposed at a middle part of the stem in such a way that a front-end part thereof can make a handling turn freely and make an up-and-down motion freely. Then, it is held by the elastic member disposed in the stem. This offers the advantages according to both the first and second aspects. Therefore, upon reaching an uphill while running, the rider can pedal almost in the same posture as riding along a level road and go uphill while exerting the strength of the legs effectively. On the other hand, upon coming to a downhill while running, the rider can straighten the back substantially vertically almost in the same way as riding along a level road and go downhill in such a comfortable posture.

In the bicycle according to the seventh aspect, the rear frame fixing the saddle on an upper-end part thereof and including the rear wheel-shaft supporting member in a lower part thereof is attached pivotally via the joint members to a rear-end part of the front frame in such a way that the rear frame can sway back and forth freely. Further, the front wheel shaft is held by the elastic member at a lower-end part of the front wheel-shaft supporting member provided in the stem and disposed so as to make an up-and-down motion freely. This offers the advantages according to both the first and third aspects. Therefore, upon reaching an uphill while running, the rider can pedal almost in the same posture as riding along a level road and go uphill while exerting the strength of the legs effectively. On the other hand, upon coming to a downhill while running, the rider can straighten the back substantially vertically almost in the same way as riding along a level road and go downhill in such a comfortable posture.

In the bicycle according to the eighth aspect, the rear frame fixes the saddle on an upper-end part thereof and includes the rear wheel-shaft supporting member in a lower part thereof. Then, it is pivotally attached at a lower-end part of the rear wheel-shaft supporting member via joint members to a rear-end part of the front frame in such a way that the rear frame can sway back and forth freely. Further, the rear wheel rotated by a pedal-attached crank on each side is disposed via the rear wheel shaft coaxial with the joint members in such a way that it can rotate freely. Therefore, if the bicycle begins to go up a slope when riding along a level road, a hill-climbing resistance working on the front wheel presses the front frame back and pushes the lower-end part of the rear wheel-shaft supporting member rearward. This turns the rear frame nearly vertically around the rear wheel shaft and moves the saddle forward. This prompts the rider sitting on the saddle to bend both arms more so as to shorten the distance between a grip portion in the handle and a seat portion on the saddle. This makes it possible to pedal almost in the same posture as riding along a level road and go uphill while exerting the strength of the legs effectively.

Furthermore, upon coming to a downhill while riding, the rider is prompted to stretch both arms so as to lengthen the distance between the grip portion in the handle and the seat portion on the saddle. This makes it possible to straighten the back substantially vertically almost in the same way as riding along a level road and go downhill in such a comfortable posture.

Moreover, the rider can move the saddle to a proper position relatively easily by simply moving the body. This makes it possible to go uphill or downhill while exerting the strength of the legs effectively in an optimum posture.

In addition, the rear frame is pivotally attached so as to sway freely, so that the position of the saddle can be easily changed. This makes it easier for the rider to shift the weight. Therefore, using a chainless system, the bicycle can be stably ridden without turning over even along an uphill.

In the bicycle according to the ninth aspect, the rear frame fixes the saddle on an upper-end part thereof and includes the rear-frame supporting member in a lower part thereof. Then, it is pivotally attached at a lower-end part of the rear-frame supporting member via joint members to a rear-end part of the front frame in such a way that the rear frame can sway back and forth freely. Further, the rear wheel rotated by a pedal-attached crank on each side is disposed via the rear wheel shaft a predetermined distance apart downward from the joint members at the rear-end part of the front frame in such a way that it can rotate freely. Therefore, if the bicycle begins to go up a slope when riding along a level road, a hill-climbing resistance working on the front wheel presses the front frame back and pushes the lower-end part of the rear-frame supporting member rearward. This turns the rear frame around the joint members and moves the saddle forward. This prompts the rider sitting on the saddle to bend both arms more so as to shorten the distance between a grip portion in the handle and a seat portion on the saddle. This makes it possible to pedal almost in the same posture as riding along a level road and go uphill while exerting the strength of the legs effectively.

Furthermore, upon coming to a downhill while riding, the rider is prompted to stretch both arms so as to lengthen the distance between the grip portion in the handle and the seat portion on the saddle. This makes it possible to straighten the back substantially vertically almost in the same way as riding along a level road and go downhill in such a comfortable posture.

Moreover, the rider can move the saddle to a proper position relatively easily by simply moving the body. This makes it possible to go uphill or downhill while exerting the strength of the legs effectively in an optimum posture.

In addition, the rear frame is pivotally attached so as to sway freely, so that the position of the saddle can be easily changed. This makes it easier for the rider to shift the weight. Therefore, using a chainless system, the bicycle can be stably ridden without turning over even along an uphill.

In the bicycle according to the tenth aspect, the stopper is provided which regulates the sway of the rear frame within a predetermined range. This presents an advantage, in addition to those according to any one of the first, sixth, seventh, eighth and ninth aspects, in that since the stopper regulates the sway of the rear frame within the predetermined range, the bicycle can be prevented from running unstably because of a significant shift in the position of the saddle with respect to the handle.

In the bicycle according to the eleventh aspect, the stopper is provided which regulates the up-and-down motion of the front-end part of the front frame within a predetermined range. In addition to the advantages according to any one of the second, forth and sixth aspects, this offers the following advantage. Since the stopper regulates the up-and-down motion of the front-end part of the front frame within the predetermined range, the motion of the saddle via the front frame and the rear frame is restricted within the predetermined range. This helps prevent the bicycle from running unstably because of a significant shift in the position of the saddle with respect to the handle.

In the bicycle according to the twelfth aspect, the stopper is provided which regulates the up-and-down motion of the front wheel-shaft supporting member within a predetermined range. In addition to the advantages according to any one of the third, fifth and seventh aspects, this presents the following advantage. Since the stopper regulates the up-and-down motion of the front wheel-shaft supporting member within a predetermined range, the posture of the saddle via the front wheel-shaft supporting member, the front frame and the rear frame is restricted within the predetermined range. This helps prevent the bicycle from running unstably with the saddle sharply inclined.

In the bicycle according to the thirteenth aspect, the lock mechanism is provided which regulates the sway of the rear frame freely in an arbitrary position. In addition to the advantages according to any one of the first, sixth, seventh, eighth, ninth and tenth aspects, this offers the following advantage. The lock mechanism regulates the sway of the rear frame freely in the arbitrary position, so that the saddle can be arbitrarily positioned with respect to the handle.

In the bicycle according to the fourteenth aspect, the lock mechanism is provided which regulates the up-and-down motion of the front-end part of the front frame freely in an arbitrary position. In addition to the advantages according to any one of the second, forth, sixth and eleventh aspects, this presents the following advantage. The lock mechanism regulates the up-and-down motion of the front-end part of the front frame freely in the arbitrary position, so that the saddle can be arbitrarily positioned with respect to the handle via the front frame and the rear frame.

In the bicycle according to the fifteenth aspect, the lock mechanism is provided which regulates the up-and-down motion of the front wheel-shaft supporting member freely in an arbitrary position. In addition to the advantages according to any one of the third, fifth, seventh and twelfth aspects, this presents the following advantage. The lock mechanism regulates the up-and-down motion of the front wheel-shaft supporting member freely in an arbitrary position, so that the posture of the saddle can be arbitrarily set via the front frame and the rear frame.

DESCRIPTION OF THE PREFERRED EMBODIMENTS

Figure 1:
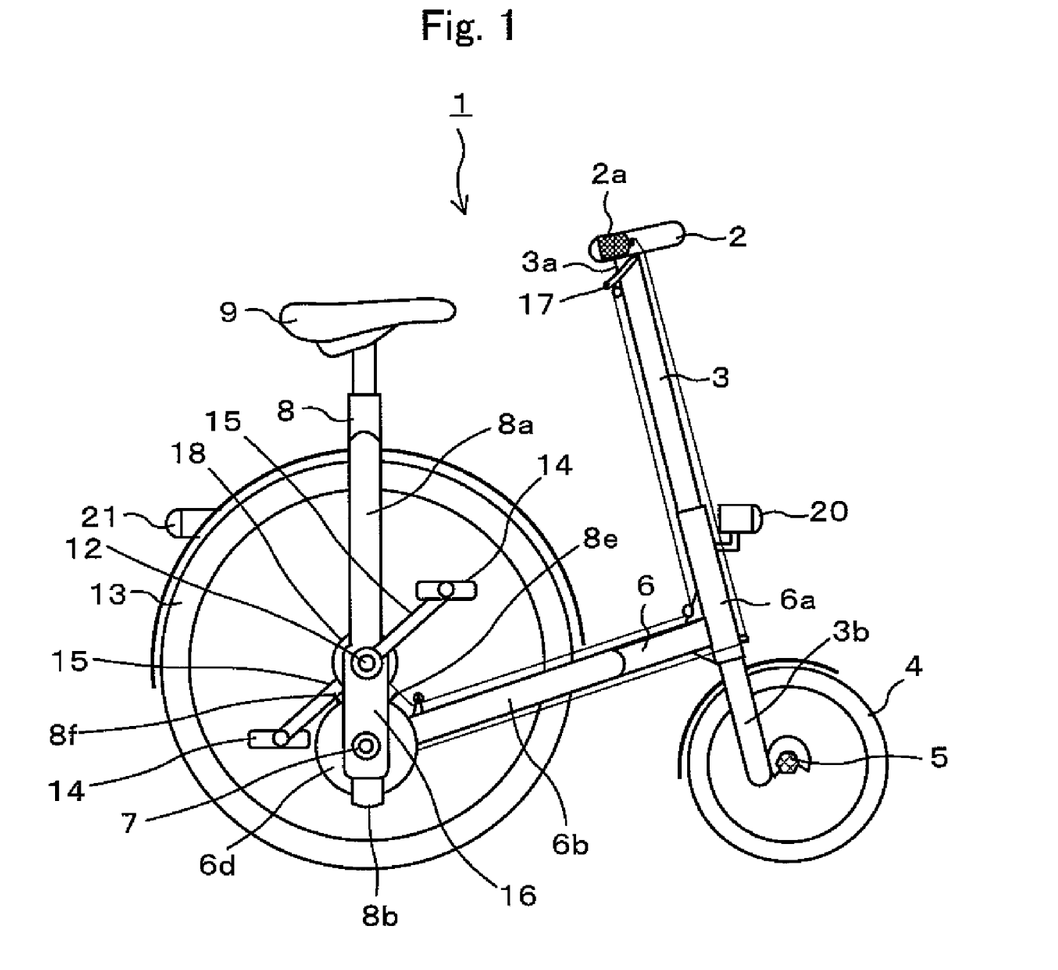
FIG. 1 is a side view of a bicycle according to a first embodiment of the present invention.
Figure 2:
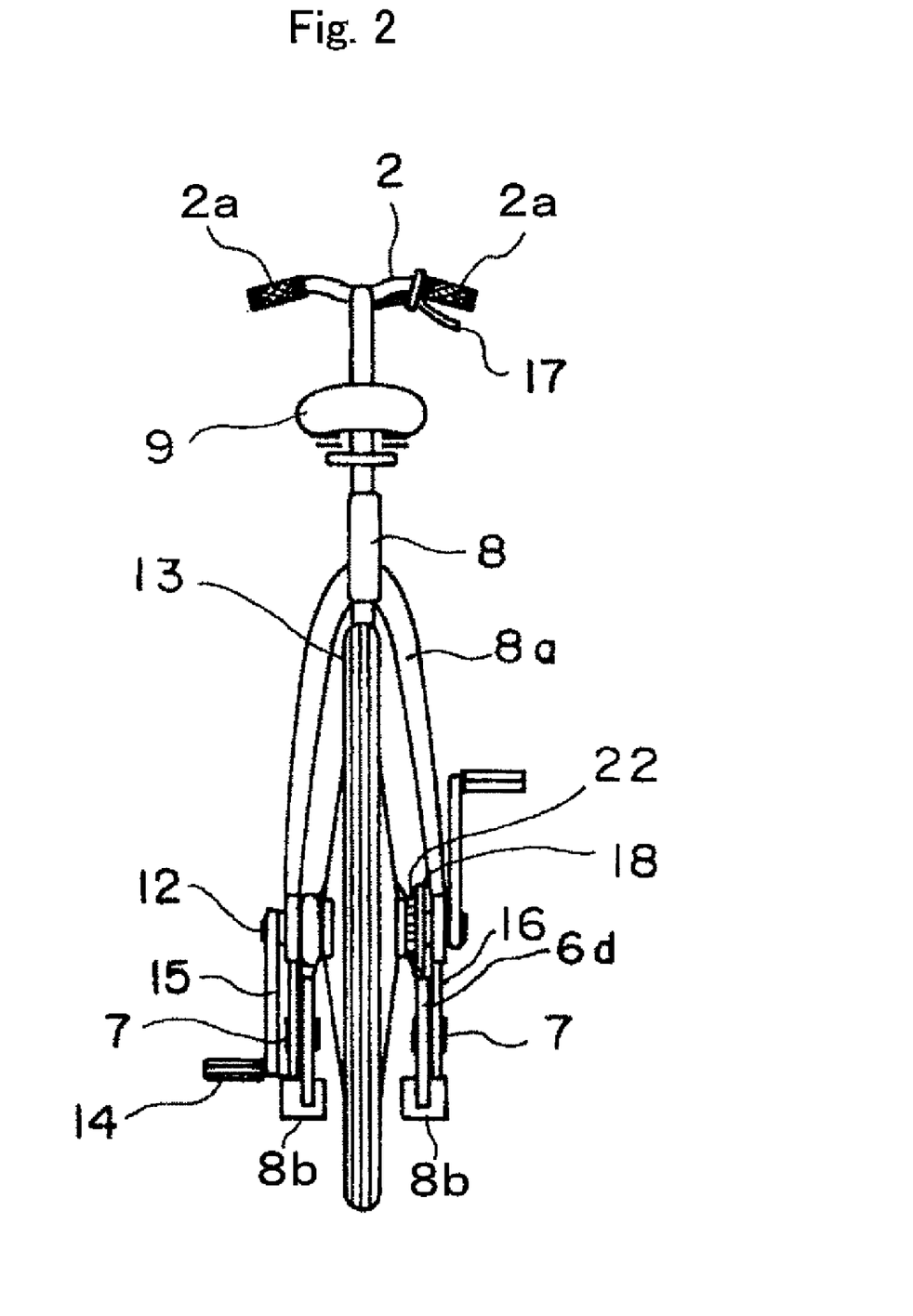
FIG. 2 is a rear view of the bicycle except a rear-wheel mudguard or the like of FIG. 1.
Figure 3A:
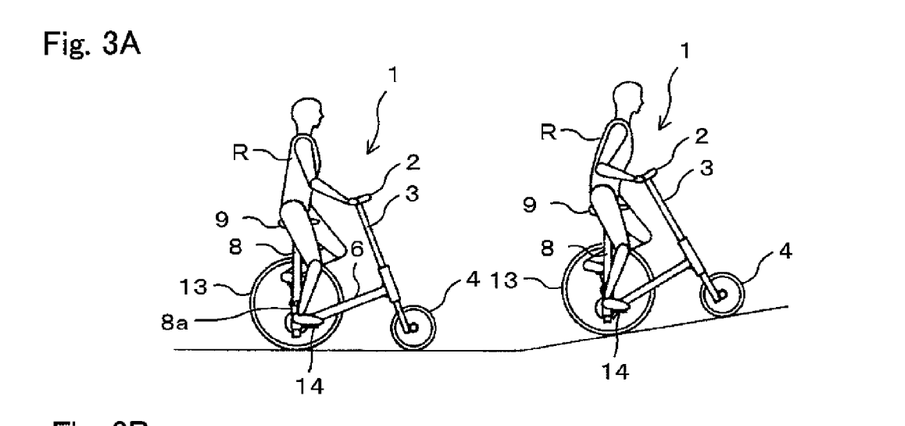
FIG. 3A is a side view showing running states of the bicycle of FIG. 1 while a rider is pedaling.
Figure 3B:
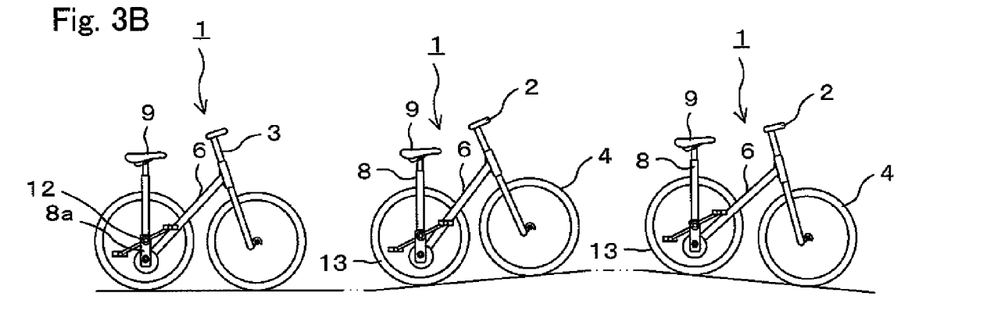
FIG. 3B is a side view showing running states of the bicycle of FIG. 1.

FIG. 1 is a side view of a bicycle according to a first embodiment of the present invention. FIG. 2 is a rear view of the bicycle of FIG. 1. FIGS. 3A and 3B show how to ride this bicycle. In the other embodiments described later, for convenience, component elements are given the same reference characters and numerals as those of the previous embodiments, as long as the former are identical to the latter. Thus, their description is omitted.

In FIGS. 1 and 2, reference numeral 1 denotes the bicycle according to the first embodiment. The bicycle 1 includes: a handle 2 having a grip 2a, 2a at each of right and left-end parts thereof; a stem 3 fixed at an upper-end part 3a thereof to a middle part of the handle 2; and a front wheel 4 attached pivotally via a front wheel shaft 5 to a lower-end part of a front wheel-shaft supporting member 3b shaped like a front fork in the lower part of the stem 3 in such a way that the front wheel 4 can rotate freely.

The stem 3 is supported at a middle part thereof by a front-end part (head tube) 6a having, for example, a cylindrical shape in a front frame 6 in such a way that the stem 3 can turn freely. This enables a rider to control the running direction by using the handle 2.

A rear frame 8 is pivotally attached at a lower-end part of a rear wheel-shaft supporting member 8a as a rear fork portion via joint members 7, 7 formed by each of right and left lateral shafts to a fork-shaped rear-end part 6b extending backward of the front frame 6, in such a way that the rear frame 8 can sway back and forth freely. A first stopper 8e and a second stopper 8f which regulate each of the forward inclination and rearward inclination of the rear wheel-shaft supporting member 8a are provided in a disk 6d fixed to the fork-shaped rear-end part 6b of the front frame 6. This helps maintain the distance between the handle 2 and a saddle 9 at an upper-end part of the rear frame 8 within a required range while running along a slope.

In order to keep the saddle 9 disposed at the upper-end part of the rear frame 8 in a required posture, the disk 6d fixed to the fork-shaped rear-end part 6b of the front frame also has the function (lock mechanism of the rear frame 8) of a disk brake. Specifically, the grip 2a of the handle 2 is turned to thereby lock or release the disk 6d using a clamp 8b fixed on the rear wheel-shaft supporting member 8a. This makes it possible to hold the rear frame 8 in any required posture and keep the saddle 9 in the required posture.

A rear wheel 13 is pivotally attached via a rear wheel shaft 12 disposed a predetermined height above the joint members 7, 7 to the rear wheel-shaft supporting member 8a of the rear frame 8. Thereby, the rear wheel 13 is rotated by a crank 15, 15 provided with a pedal 14, 14 on each side.

Incidentally, a disk brake 18 is provided which brakes the rear wheel 13 using a lever 17 attached to the handle 2. There is further provided a bell (not shown), or a head lamp 20 and a tail lamp 21.

A ratchet mechanism 22 is also provided which can keep the pedals 14, 14 at a stop according to the rotation state of the rear wheel 13.

In this way, in the bicycle 1 according to the first embodiment, the rear frame 8 fixing the saddle 9 on an upper-end part thereof and including the rear wheel-shaft supporting member 8a in a lower part thereof is pivotally attached via the joint members 7, 7 to a rear-end part of the front frame 6 in such a way that the rear frame 8 can sway back and forth freely. The rear wheel shaft 12 is disposed a predetermined height above the joint members 7, 7. Therefore, if the bicycle 1 begins to go up a slope when riding along a level road, a hill-climbing resistance working on the front wheel 4 presses the front frame 6 back and pushes the lower-end part of the rear wheel-shaft supporting member 8a rearward. This turns the rear frame 8 around the rear wheel shaft 12 and moves the saddle 9 forward. As shown in FIG. 3A, this prompts the rider R sitting on the saddle 9 to bend both arms more so as to shorten the distance between a grip portion in the handle 2 and a seat portion on the saddle 9. This makes it possible to use the pedals 14, 14 almost in the same posture as riding along a level road and go uphill while exerting the strength of the legs effectively.

Furthermore, upon coming to a downhill while riding, the running resistance working on the front wheel 4 becomes weaker. This moves the front frame 6 forward and pulls forward the lower-end part of the rear wheel-shaft supporting member 8a. This turns the rear frame 8 around the rear wheel shaft 12 and moves the saddle 9 backward. This prompts the rider R to stretch both arms so as to lengthen the distance between the grip portion in the handle 2 and the seat portion on the saddle 9. This makes it possible to straighten the back substantially vertically almost in the same way as riding along a level road and go downhill in such a comfortable posture.

Moreover, the rider R can move the saddle 9 to a proper position relatively easily by simply moving the body. This makes it possible to go uphill or downhill while exerting the strength of the legs effectively in an optimum posture.

In addition, the rear frame 8 is pivotally attached so as to sway freely, so that the position of the saddle 9 can be easily changed. This makes it easier for the rider R to shift the weight. Hence, if the rider R shifts the weight to move the center of gravity of the bicycle 1 on an upward slope, then using a chainless system, the bicycle 1 can be stably ridden without turning over even along the uphill.

Furthermore, the lower-end part of the rear wheel-shaft supporting member 8a is pivotally attached via the joint members 7, 7 to the rear-end part of the front frame 6, and the rear wheel shaft 12 is disposed a predetermined height above the joint members 7, 7. Hence, if the rear wheel-shaft supporting member 8a turns around the rear wheel shaft 12, the part of the rear wheel-shaft supporting member 8a from the rear wheel shaft 12 up to the joint members 7, 7 functions as a balancer for holding the rear frame 8 substantially vertically. Specifically, the joint members 7, 7 receive a downward force by the weight of the part of the rear wheel-shaft supporting member 8a from the rear wheel shaft 12 up to the joint members 7, 7 and a load applied to the rear-end part of the front frame 6. At the same time, the rear-end part of the front frame 6 restrains the rear frame 8 from turning around the rear wheel shaft 12. This helps hold the rear frame 8 substantially vertically around the rear wheel shaft 12 as well as hold the saddle 9 on a substantially vertical line along the rear frame 8. Hence, such a vehicle can be ridden more stably and more safely. Besides, since the rear frame 8 is held substantially vertically, the rear wheel 13 bears the weight of the rider R substantially vertically. This heightens the pressure by which the rear wheel 13 is in contact with the ground, and thus, raises the driving force. Consequently, the rear wheel 13 rotated forward by the pedals 14, 14 can be prevented from skidding (slipping) when riding in rain or the like.

Moreover, in the bicycle 1 according to the first embodiment, in order to regulate the distance between the handle 2 and the saddle 9 within a required range, the first stopper 8e and the second stopper 8f are disposed which regulate the forward inclination and rearward inclination of the rear frame 8, respectively. Thereby, the first stopper 8e regulates the operation of shortening the distance between the saddle 9 and the handle 2 while the second stopper 8f regulates the operation of lengthening the distance between the saddle 9 and the handle 2. This helps prevent a significant shift in the position of the saddle 9 with respect to the handle 2 from causing an unstable running state.

In addition, in the bicycle 1 according to the first embodiment, the disk 6d as the rear-frame lock mechanism which can freely regulate the sway of the rear frame 8 and the clamp 8b are disposed near the joint members 7, 7 of the front frame 6. Therefore, using the rear-frame lock mechanism, the rider R can fix the saddle 9 in the most suitable position while pedaling.

Figure 4A:
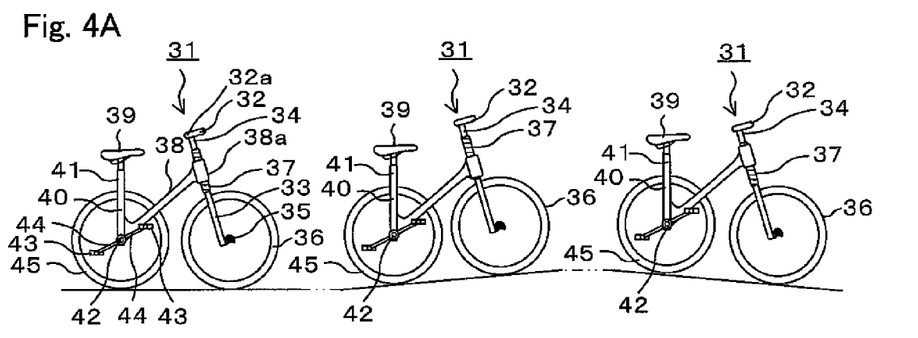
FIG. 4A is a side view showing a bicycle according to a second embodiment of the present invention and running states thereof.
Figure 4B:
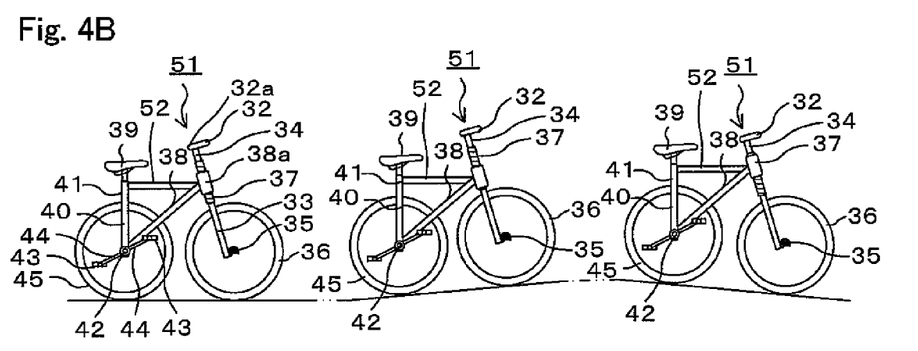
FIG. 4B is a side view showing a bicycle according to a third embodiment of the present invention and running states thereof.

FIG. 4A is a side view showing running states of a bicycle according to a second embodiment of the present invention. FIG. 4B is a side view showing running states of a bicycle according to a third embodiment of the present invention.

In FIG. 4A, reference numeral 31 designates the bicycle according to the second embodiment. The bicycle 31 includes: a stem 34 fixing a handle 32 having a grip 32a, 32a on an upper-end part thereof and provided at a lower part thereof with a front wheel-shaft supporting member 33; a front wheel 36 attached pivotally via a front wheel shaft 35 to a lower-end part of the front wheel-shaft supporting member 33; a front frame 38 disposed at a middle part of the stem 34 in such a way that a front-end part 38a thereof shaped like, for example, a cylinder, can make a turn and an up-and-down motion freely, for example, can make an up-and-down slide freely, held by an elastic member 37 disposed in the stem 34, and extending rearward from the front-end part 38a; a rear frame 41 fixing a saddle 39 on an upper-end part thereof, including a rear wheel-shaft supporting member 40 in a lower part thereof and fixing a lower-end part of the rear wheel-shaft supporting member 40 on a rear-end part of the front frame 38; and a rear wheel 45 disposed via a rear wheel shaft 42 at the lower-end part of the rear wheel-shaft supporting member 40 in such a way that the rear wheel can rotate freely, and rotated by a crank 44, 44 provided with a pedal 43, 43 on each side.

In order to regulate each of the forward inclination and rearward inclination of the rear frame 41, a first stopper and a second stopper (not shown) which regulate the range of an up-and-down motion of the front-end part 38a are disposed near the elastic member 37 of the stem 34. This makes it possible to maintain the distance between the handle 32 and the saddle 39 on the upper-end part of the rear frame 41 within a required range while riding along a slope.

Furthermore, in order to keep the saddle 39 in a required posture, an optional lock mechanism (not shown) is also provided which keeps the up-and-down motion of the front-end part 38a in a fixed position by turning the grip 32a of the handle 32 or by another means.

In this way, in the bicycle 31 according to the second embodiment, the front-end part 38a of the front frame 38 extending rearward is disposed at the middle part of the stem 34 in such a way that it can make a turn and an up-and-down motion, for example, an up-and-down slide. Then, it is held by the elastic member 37 disposed in the stem 34. Therefore, a rider sitting on the saddle can pedal in a stable posture. If the bicycle 31 begins to go up a slope when riding along a level road, a hill-climbing resistance working on the front wheel 36 moves the front-end part 38a of the front frame 38 toward the lower end of the stem 34 against the force of the elastic member 37 and inclines the front frame 38. This inclines the rear frame 41 as well and moves the saddle 39 forward. This prompts the rider to bend both arms more so as to shorten the distance between a grip portion of the grip 32a, 32a of the handle 32 and a seat portion on the saddle 39. In the same way as FIG. 3A, this makes it possible to use the pedals 43, 43 almost in the same posture as riding along a level road and go uphill while exerting the strength of the legs effectively.

At this time, the operation of shortening the distance between the saddle 39 and the handle 32 is regulated within the expansion-and-contraction range of the elastic member 37. This helps prevent a significant shift in the position of the saddle 39 with respect to the handle 32 from causing an unstable running state.

Furthermore, upon coming to a downhill while running, the running resistance working on the front wheel 36 becomes weaker. Then, the force of the elastic member 37 moves the front-end part 38a of the front frame 38 toward the upper part of the stem 34 and inclines the front frame 38. This inclines the rear frame 41 as well and moves the saddle 39 backward. This prompts the rider to stretch both arms so as to lengthen the distance between the grip portion of the grip 32a, 32a of the handle 32 and the seat portion on the saddle 39. This makes it possible to straighten the back substantially vertically almost in the same way as riding along a level road and go downhill in such a comfortable posture.

In FIG. 4B, reference numeral 51 denotes the bicycle according to the third embodiment. In addition to the bicycle (31 of FIG. 4A) according to the second embodiment, the bicycle 51 includes an upper frame 52 connecting the front-end part 38a of the front frame 38 and an upper-end part of the rear frame 41.

In this way, in the bicycle 51, the upper frame 52 fixes the front-end part 38a of the front frame 38 and the upper-end part of the rear frame 41. This helps make the frames more rigid.

Figure 5A:
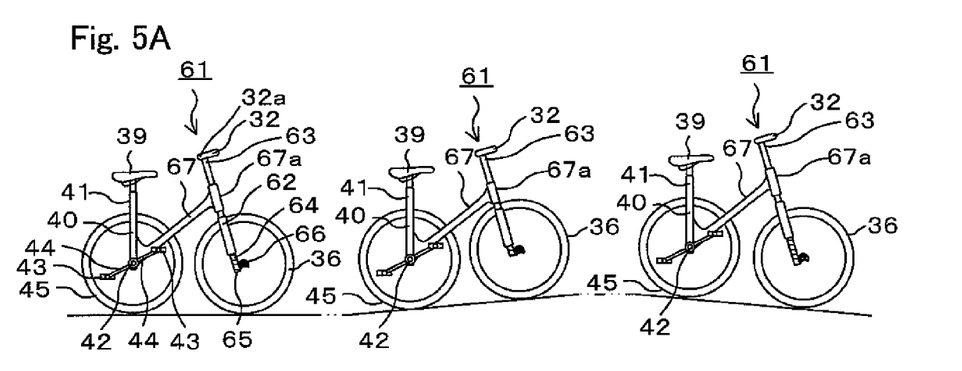
FIG. 5A is a side view showing a bicycle according to a forth embodiment of the present invention and running states thereof.

FIG. 5A is a side view showing running states of a bicycle according to a fourth embodiment of the present invention.

Figure 5B:
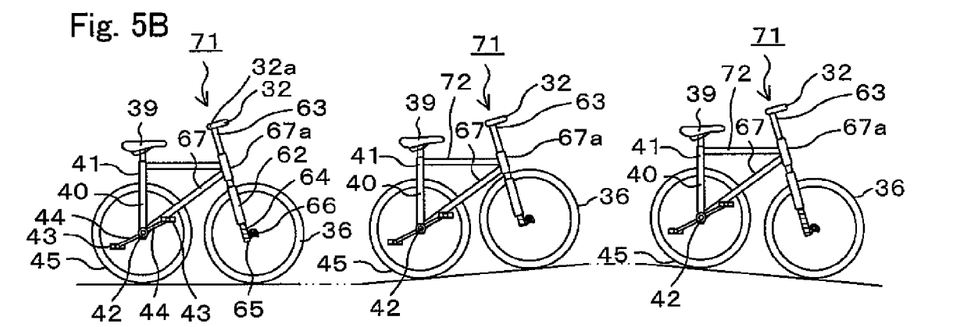
FIG. 5B is a side view showing a bicycle according to a fifth embodiment of the present invention and running states thereof.

FIG. 5B is a side view showing running states of a bicycle according to a fifth embodiment of the present invention.

In FIG. 5A, reference numeral 61 designates the bicycle according to the fourth embodiment. The bicycle 61 is a variation of the bicycle (31 of FIG. 4A) according to the second embodiment and provided with an elastic member 64 in a different position from the elastic member (37 of FIG. 4A) thereof. It includes: a stem 63 provided at a lower part thereof with a front wheel-shaft supporting member 62; a slide member 65 freely slid by the force of the elastic member 64 at a lower-end part of the front wheel-shaft supporting member 62; a front wheel shaft 66 fixed to a lower-end part of the slide member 65; a front wheel 36 attached pivotally via the front wheel shaft 66; a front frame 67 supported on a middle part of the stem 63 in such a way that a front-end part 67a thereof shaped like, for example, a cylinder, can turn freely and extending rearward.

In order to regulate each of the forward inclination and rearward inclination of the rear frame 41, a first stopper and a second stopper (not shown) which regulate the range of an up-and-down motion of the front wheel-shaft supporting member 62 are disposed in the slide member 65. This makes it possible to maintain the inclination of the saddle 39 within a required range while riding along a slope.

Furthermore, in order to keep the saddle 39 in any required posture (inclination), an optional lock mechanism (not shown) is also provided which keeps the up-and-down motion of the front wheel-shaft supporting member 62 in a fixed position by turning the grip 32a of the handle 32 or by another means.

In this way, in the bicycle 61 according to the fourth embodiment, the front wheel shaft 66 is held by the elastic member 64 disposed at the lower-end part of the front wheel-shaft supporting member 62 and disposed so as to make an up-and-down motion freely. Therefore, a rider sitting on the saddle 39 can pedal in a stable posture. If the bicycle 61 begins to go up a slope when riding along a level road, a hill-climbing resistance working on the front wheel 36 moves the front wheel shaft 66 upward against the force of the elastic member 64. In other words, it slides the slide member 65 upward with respect to the front wheel-shaft supporting member 62 against the force of the elastic member 64 and thereby moves the stem 63 downward with respect to the front wheel shaft 66. As the stem 63 moves down, the rear frame 41 fixed via the front frame 67 by the stem 63 also inclines forward. This brings the rear frame 41 nearly vertically and moves the saddle 39 forward so that its inclination (posture) is changed. This makes it possible for the rider sitting on the saddle 39 to use the pedals 43, 43 while straightening the back almost in the same comfortable posture as riding along a level road and go uphill while exerting the strength of the legs effectively. In this case, the distance between the saddle 39 and the grip portion of the handle 32 is not shortened. Hence, the rider sitting on the saddle 39 is not prompted to bend both arms more.

At this time, the first stopper regulates the range within which the saddle 39 moves forward to thereby change its inclination. This helps prevent a significant change in the inclination of the saddle 39 from causing an unstable running state.

Furthermore, upon coming to a downhill while running, the running resistance working on the front wheel 36 becomes weaker. Then, the force of the elastic member 64 moves the front wheel shaft 66 downward. In other words, it moves the stem 63 upward with respect to the front wheel shaft 66. As the stem 63 moves up, the rear frame 41 fixed via the front frame 67 by the stem 63 also inclines backward. This brings the rear frame 41 nearly vertically and moves the saddle 39 backward so that its inclination is changed. This makes it possible for the rider sitting on the saddle 39 to use the pedals 43, 43 while straightening the back almost in the same comfortable posture as riding along a level road and go downhill while exerting the strength of the legs effectively.

At this time, the second stopper regulates the range within which the saddle 39 moves backward to thereby change its inclination. This helps prevent some significant change in the inclination of the saddle 39 from causing an unstable running state.

In FIG. 5B, reference numeral 71 denotes the bicycle according to the fifth embodiment. In addition to the bicycle (61 of FIG. 5A) according to the fourth embodiment, the bicycle 71 includes an upper frame 72 connecting the front-end part 67a of the front frame 67 and an upper-end part of the rear frame 41.

In this way, in the bicycle 71, the upper frame 72 fixes the front-end part 67a of the front frame 67 and the upper-end part of the rear frame 41. This helps make the frames more rigid.

Figure 6A:
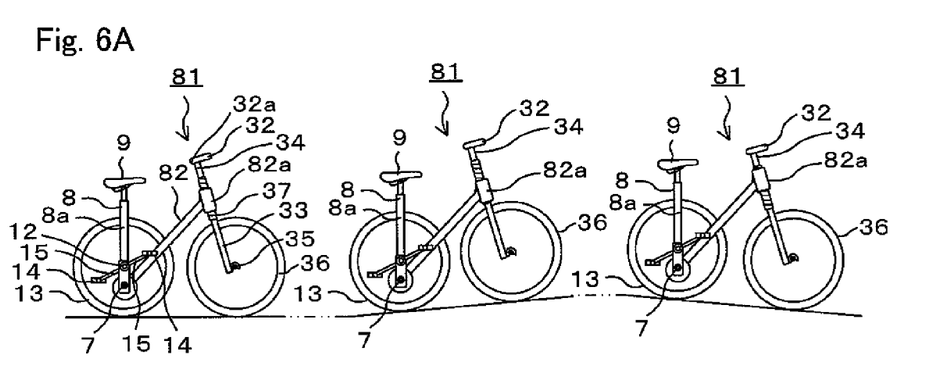
FIG. 6A is a side view showing a bicycle according to a sixth embodiment of the present invention and running states thereof.
Figure 6B:
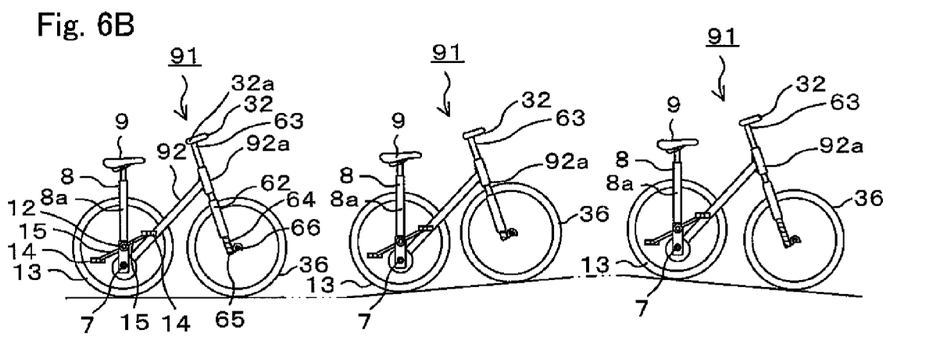
FIG. 6B is a side view showing a bicycle according to a seventh embodiment of the present invention and running states thereof.

FIG. 6A is a side view showing running states of a bicycle according to a sixth embodiment of the present invention. FIG. 6B is a side view showing running states of a bicycle according to a seventh embodiment of the present invention.

In FIG. 6A, reference numeral 81 designates the bicycle according to the sixth embodiment. The bicycle 81 is configured by combining the bicycle (1 of FIG. 1) according to the first embodiment and the bicycle (31 of FIG. 4A) according to the second embodiment. Hence, it has the advantages of both bicycles. The bicycle 81 includes: a stem 34 fixing a handle 32 on an upper-end part thereof and provided at a lower part thereof with a front wheel-shaft supporting member 33; a front wheel 36 attached pivotally via a front wheel shaft 35 to a lower-end part of the front wheel-shaft supporting member 33; a front frame 82 disposed at a middle part of the stem 34 in such a way that a front-end part 82a thereof shaped like, for example, a cylinder, can make a turn and an up-and-down motion freely, for example, can make an up-and-down slide freely, held by an elastic member 37 disposed in the stem 34, and extending rearward from the front-end part 82a; a rear frame 8 fixing a saddle 9 on an upper-end part thereof, including a rear wheel-shaft supporting member 8a in a lower part thereof and pivotally attached at a lower-end part of the rear wheel-shaft supporting member 8a via joint members 7, 7 formed by each of right and left lateral shafts to a rear-end part of the front frame 82 in such a way that it can sway back and forth freely; and a rear wheel 13 disposed via a rear wheel shaft 12 a predetermined height above the joint members 7 of the rear wheel-shaft supporting member 8a in such a way that it can rotate freely, and rotated by a crank 15, 15 provided with a pedal 14, 14 on each side.

Moreover, the bicycle 81 is provided with a first stopper and a second stopper, and a lock mechanism, which are similar to those of the bicycle (31 of FIG. 4A) according to the second embodiment. Further, it is provided with a first stopper and a second stopper, and a lock mechanism, which are similar to those of the bicycle (1 of FIG. 1) according to the first embodiment. Hence, it has the same advantages.

In this way, the bicycle 81 according to the sixth embodiment includes: the front frame 82 disposed at the middle part of the stem 34 in such a way that the front-end part 82a can make a turn and an up-and-down motion freely, for example, can make an up-and-down slide freely, held by the elastic member 37 disposed in the stem 34, and extending rearward from the front-end part 82a; a rear frame 8 pivotally attached at the lower-end part of the rear wheel-shaft supporting member 8a via the joint members 7, 7 as the joint members to the rear-end part of the front frame 82 in such a way that it can sway back and forth freely; and a rear wheel 13 disposed via the rear wheel shaft 12 the predetermined height above the joint members 7 of the rear wheel-shaft supporting member 8a in such a way that it can rotate freely. Therefore, it has the advantages of both the bicycle 1 according to the first embodiment and the bicycle 31 according to the second embodiment. Specifically, a rider sitting on the saddle 9 can pedal in a stable posture. If the bicycle 81 begins to go up a slope when riding along a level road, a hill-climbing resistance working on the front wheel 36 presses the front frame 82 back and pushes the lower-end part of the rear wheel-shaft supporting member 8a rearward. This turns the rear frame 8 around the rear wheel shaft 12 and moves the saddle 9 forward. Further, a hill-climbing resistance working on the front wheel 36 moves the front-end part 82a of the front frame 82 toward the lower end of the stem 34 against the force of the elastic member 37 and inclines the front frame 82. This inclines the rear frame 8 as well and moves the saddle 9 forward. The interaction between those shifts prompts the rider to bend both arms more so as to shorten the distance between a grip portion of the grip 32a, 32a of the handle 32 and a seat portion on the saddle 9. This makes it possible, as shown in FIG. 3, to use the pedals 14, 14 while straightening the back almost in the same comfortable posture as riding along a level road and go downhill while exerting the strength of the legs effectively.

Furthermore, upon coming to a downhill slope, in the same way, the bicycle 81 has the advantages of both the bicycle 1 according to the first embodiment and the bicycle 31 according to the second embodiment.

In FIG. 6B, reference numeral 91 designates the bicycle according to the seventh embodiment. The bicycle 91 is a variation of the bicycle (81 of FIG. 6A) according to the fifth embodiment and provided with the elastic member 64 in a different position from the elastic member (37 of FIG. 6A) thereof. It includes: the stem 63 provided at a lower part thereof with the front wheel-shaft supporting member 62; the slide member 65 freely slid by the force of the elastic member 64 at a lower-end part of the front wheel-shaft supporting member 62; the front wheel shaft 66 fixed to a lower-end part of the slide member 65; the front wheel 36 attached pivotally via the front wheel shaft 66; a front frame 92 supported on a middle part of the stem 63 in such a way that a front-end part 92a thereof shaped like, for example, a cylinder, can turn freely and extending rearward.

Moreover, the bicycle 81 is provided with a first stopper and a second stopper, and a lock mechanism, which are similar to those of the bicycle (61 of FIG. 5A) according to the fourth embodiment. Further, it is provided with a first stopper and a second stopper, and a lock mechanism, which are similar to those of the bicycle (1 of FIG. 1) according to the first embodiment. Hence, it has the same advantages.

Hence, the bicycle 91 according to the seventh embodiment includes: a stem 63 provided at the lower part thereof with the front wheel-shaft supporting member 62; the front wheel shaft 66 held by the elastic member 64 at the lower-end part of the front wheel-shaft supporting member 62 and disposed so as to make an up-and-down motion freely; the front wheel 36 attached pivotally via the front wheel shaft 66; and the front frame 92 supported on the middle part of the stem 63 in such a way that the front-end part 92a can turn freely and extending rearward. Therefore, it has the advantages of both the bicycle 1 according to the first embodiment and the bicycle 61 according to the fourth embodiment. Specifically, a rider sitting on the saddle 9 can pedal in a stable posture. If the bicycle 91 begins to go up a slope when riding along a level road, a hill-climbing resistance working on the front wheel 36 moves the front frame 82 back and pushes the lower-end part of the rear wheel-shaft supporting member 8a rearward. This turns the rear frame 8 around the rear wheel shaft 12 and moves the saddle 9 forward. On the other hand, a hill-climbing resistance working on the front wheel 36 moves the front-end part 92a of the front frame 92 toward the lower part of the stem 34 against the force of the elastic member 64 and inclines the front frame 92. This inclines the rear frame 8 as well and moves the saddle 9 forward. The interaction between those shifts prompts the rider to bend both arms more so as to shorten the distance between a grip portion of the grip 32a, 32a of the handle 32 and a seat portion on the saddle 9. This brings the rear frame 8 nearly vertically and moves the saddle 9 forward so that its inclination is changed. This makes it possible, as shown in FIG. 3, to use the pedals 14, 14 while straightening the back almost in the same comfortable posture as riding along a level road and go downhill while exerting the strength of the legs effectively.

Furthermore, upon coming to a downhill slope, in the same way, the bicycle 81 has the advantages of both the bicycle 1 according to the first embodiment and the bicycle 61 according to the fourth embodiment.

Figures 7A, 7B:
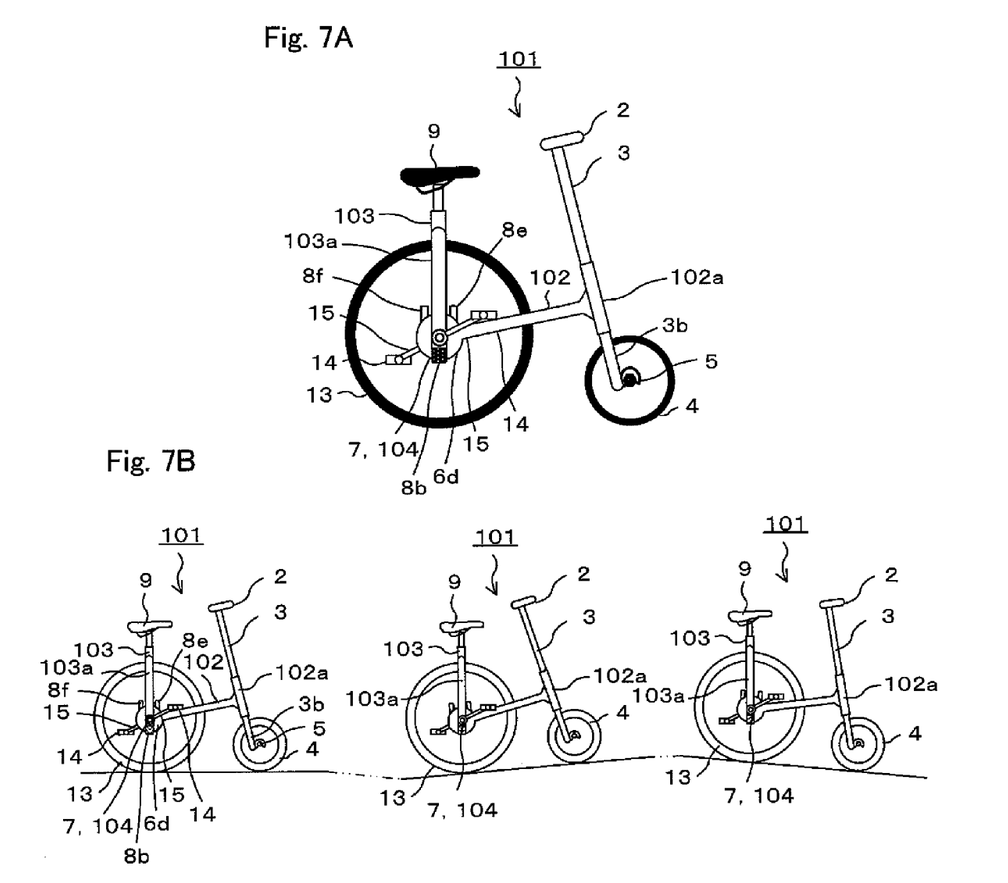
FIG. 7A is a side view of a bicycle according to an eighth embodiment of the present invention.
FIG. 7B is a side view showing running states of the bicycle according to the eighth embodiment.

FIG. 7A is a side view of a bicycle according to an eighth embodiment of the present invention. FIG. 7B is a side view showing running states of the bicycle according to the eighth embodiment.

In FIG. 7, reference numeral 101 denotes the bicycle according to the eighth embodiment. The bicycle 101 is obtained by simplifying the bicycle (1 of FIG. 1) according to the first embodiment. It includes: the stem 3 fixing the handle 2 on an upper-end part thereof and provided at a lower part thereof with the front wheel-shaft supporting member 3b; the front wheel 4 attached pivotally via the front wheel shaft 5 to a lower-end part of the front wheel-shaft supporting member 3b; a front frame 102 supporting a middle part of the stem 3 in such a way that a front-end part 102a thereof shaped like, for example, a cylinder can make a handling turn freely, and extending rearward; a rear frame 103 fixing the saddle 9 on an upper-end part thereof, including a rear wheel-shaft supporting member 103a in a lower part thereof and pivotally attached at a lower-end part of the rear wheel-shaft supporting member 103a via the joint members 7, 7 to a rear-end part of the front frame 102 in such a way that it can sway back and forth freely; and the rear wheel 13 disposed via a rear wheel shaft 104 coaxial with the joint members 7, 7 of the rear wheel-shaft supporting member 8a in such a way that it can rotate freely, and rotated by the crank 15, 15 provided with the pedal 14, 14 on each side.

Moreover, the bicycle 81 is provided with the first stopper 8e and the second stopper 8f, and a lock mechanism, which are similar to those of the bicycle (1 of FIG. 1) according to the first embodiment. Hence, it has the same advantages.

As described above, in the bicycle 101 according to the eighth embodiment, the rear frame 103 fixing the saddle 9 on the upper-end part thereof includes the rear wheel-shaft supporting member 103a in the lower part thereof and is pivotally attached at the lower-end part of the rear wheel-shaft supporting member 103a via the joint members 7, 7 to the rear-end part of the front frame 102 in such a way that it can sway back and forth freely. Therefore, if the bicycle 101 begins to go up a slope when riding along a level road, a hill-climbing resistance working on the front wheel 4 pushes the front frame 102 back and pushes back the lower-end part of the rear wheel-shaft supporting member 103a. This turns the rear frame 103 around the rear wheel shaft 104 and moves the saddle 9 forward. This prompts the rider sitting on the saddle 9 to bend both arms more so as to shorten the distance between a grip portion in the handle 2 and a seat portion on the saddle 9. This makes it possible to use the pedals 14, 14 almost in the same posture as riding along a level road and go downhill while exerting the strength of the legs effectively.

Furthermore, upon coming to a downhill while riding, the rider is urged to stretch both arms so as to lengthen the distance between the grip portion of the handle 2 and the seat portion of the saddle. This makes it possible to straighten the back substantially vertically almost in the same way as riding along a level road and go downhill in such a comfortable posture.

Moreover, the rider can move the saddle 9 to a proper position relatively easily by simply moving the body. This makes it possible to go uphill or downhill while exerting the strength of the legs effectively in an optimum posture.

In addition, the rear frame 103 is pivotally attached so as to sway freely, so that the position of the saddle 9 can be easily changed. This makes it easier for the rider to shift the weight. Therefore, using a chainless system, the bicycle can be stably ridden without turning over even along an uphill.

Furthermore, the bicycle 101 according to the eighth embodiment has a simple configuration so that it can be produced at a low cost.

Moreover, the bicycle 101 according to the eighth embodiment can be improved by providing the elastic member 37 according to the second embodiment or the elastic member 64 according to the fourth embodiment. In that case, it also has the above described advantages obtained by the elastic member 37 or 64.

Figure 8A:
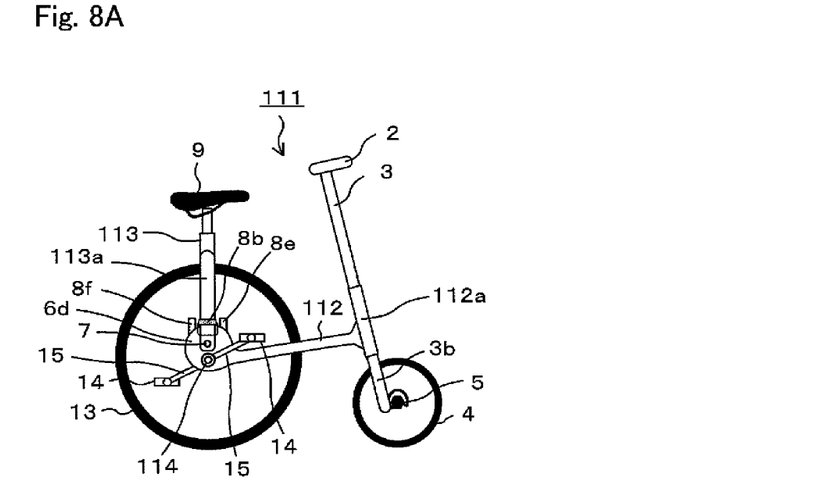
FIG. 8A is a side view of a bicycle according to a ninth embodiment of the present invention.
Figure 8B:
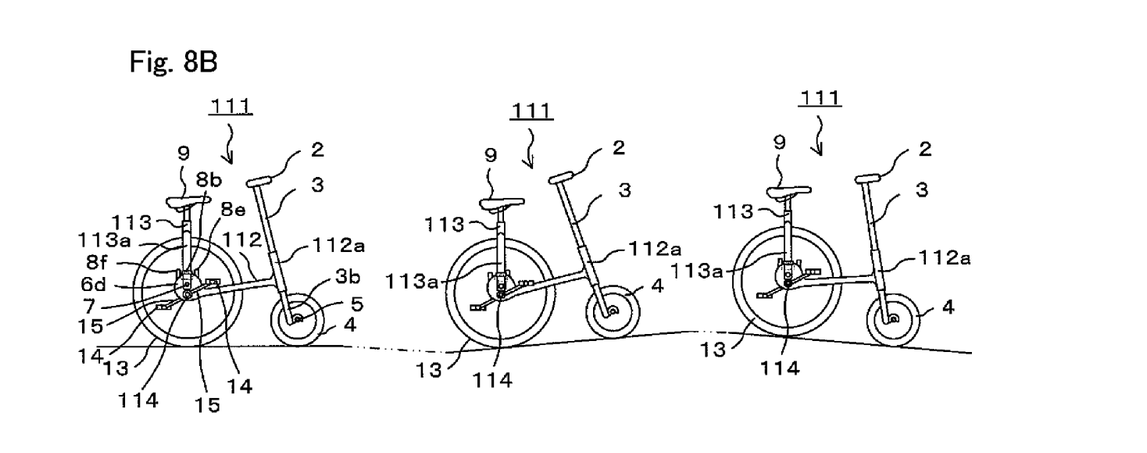
FIG. 8B is a side view showing running states of the bicycle according to the ninth embodiment.

FIG. 8A is a side view of a bicycle according to a ninth embodiment of the present invention. FIG. 8B is a side view showing running states of the bicycle according to the ninth embodiment.

In FIG. 8, reference numeral 111 denotes the bicycle according to the ninth embodiment. The bicycle 111 is a variation of the bicycle (1 of FIG. 7) according to the eighth embodiment. It includes: the stem 3 fixing the handle 2 on an upper-end part thereof and provided at a lower part thereof with the front wheel-shaft supporting member 3b; the front wheel 4 attached pivotally via the front wheel shaft 5 to a lower-end part of the front wheel-shaft supporting member 3b; a front frame 112 supporting a middle part of the stem 3 in such a way that a front-end part 112a thereof shaped like, for example, a cylinder can make a handling turn freely, and extending rearward; a rear frame 113 fixing the saddle 9 on an upper-end part thereof, including a rear-frame supporting member 103a in a lower part thereof and pivotally attached at a lower-end part of the rear-frame supporting member 113a via the joint members 7, 7 to a rear-end part of the front frame 112 in such a way that it can sway back and forth freely; and the rear wheel 13 disposed via a rear wheel shaft 114 a predetermined distance apart downward from the joint members 7, 7 at the rear-end part of the front frame 112 in such a way that it can rotate freely, and rotated by the crank 15, 15 provided with the pedal 14, 14 on each side.

Moreover, the bicycle 111 is provided with the first stopper 8e and the second stopper 8f, and a lock mechanism, which are similar to those of the bicycle (1 of FIG. 1) according to the first embodiment. Hence, it has the same advantages.

As described above, in the bicycle 111 according to the ninth embodiment, the rear frame 113 is pivotally attached at the lower-end part of the rear-frame supporting member 113a via the joint members 7, 7 to the rear-end part of the front frame 112 in such a way that it can sway back and forth freely. Further, the rear wheel 13 rotated by the crank 15, 15 provided with the pedal 14, 14 on each side is disposed via the rear wheel shaft 114 placed a predetermined distance apart downward from the joint members 7, 7 at the rear-end part of the front frame 112 in such a way that it can rotate freely. Therefore, if the bicycle 111 begins to go up a slope when riding along a level road, a hill-climbing resistance working on the front wheel 4 pushes the front frame 112 back and pushes back the lower-end part of the rear-frame supporting member 113a. This turns the rear frame 113 around the joint members 7, 7 and moves the saddle 9 forward. This prompts the rider sitting on the saddle 9 to bend both arms more so as to shorten the distance between a grip portion in the handle 2 and a seat portion on the saddle 9. This makes it possible to use the pedals 14, 14 almost in the same posture as riding along a level road and go downhill while exerting the strength of the legs effectively.

Furthermore, upon coming to a downhill while riding, the rider is urged to stretch both arms so as to lengthen the distance between the grip portion of the handle 2 and the seat portion of the saddle 9. This makes it possible to straighten the back substantially vertically almost in the same way as riding along a level road and go downhill in such a comfortable posture.

Moreover, the rider can move the saddle 9 to a proper position relatively easily by simply moving the body. This makes it possible to go uphill or downhill while exerting the strength of the legs effectively in an optimum posture.

In addition, the rear frame 113 is pivotally attached so as to sway freely, so that the position of the saddle 9 can be easily changed. This makes it easier for the rider to shift the weight. Therefore, using a chainless system, the bicycle can be stably ridden without turning over even along an uphill.

Furthermore, the bicycle 111 according to the ninth embodiment has a simple configuration so that it can be produced at a low cost.

Moreover, the bicycle 111 according to the ninth embodiment can be improved by providing the elastic member 37 according to the second embodiment or the elastic member 64 according to the fourth embodiment. In that case, it also has the above described advantages obtained by the elastic member 37 or 64.

In sum, each of the bicycles 1, 31, 51, 61, 71, 81, 91, 101 and 111 described so far according to the present invention has a chainless system in common, so that its size and weight are reduced. Simultaneously, a rider can be prevented from turning such a bicycle over backward on an uphill slope. Further, the rider can pedal the bicycle while consuming his or her energy more efficiently by exerting the strength of the legs effectively.

What is claimed is:

1. A bicycle, comprising:
   a stem fixing a handle on an upper-end part thereof and including a front wheel-shaft supporting member in a lower part thereof;
   a front wheel attached pivotally via a front wheel shaft to a lower-end part of the front wheel-shaft supporting member;
   a front frame supporting a middle part of the stem in such a way that a front-end part thereof makes a handling turn freely, and extending rearward;
   a rear frame fixing a saddle on an upper-end part thereof, including a rear wheel-shaft supporting member in a lower part thereof, and attached pivotally at a lower-end part of the rear wheel-shaft supporting member via joint members to a rear-end part of the front frame in such a way that the rear frame sways back and forth freely; and
   a rear wheel disposed via a rear wheel shaft a predetermined height above the joint members at the rear wheel-shaft supporting member in such a way that the rear wheel rotates freely, and rotated by a pedal-attached crank on each side.

2. The bicycle according to claim 1, wherein a stopper is provided which regulates the sway of the rear frame within a predetermined range.

3. The bicycle according to claim 1, wherein a lock mechanism is provided which regulates the sway of the rear frame freely in an arbitrary position.

* * * * *